3,582,442
ARTIFICIAL LEATHER HAVING A POLYPEPTIDE
FILM AS THE SURFACE LAYER
Tadayo Kaneko, Tokyo, Japan, assignor to Hitachi
Chemical Company, Ltd., Tokyo, Japan
Filed Jan. 30, 1968, Ser. No. 701,578
Claims priority, application Japan, Jan. 31, 1967,
42/8,040; May 27, 1967, 42/33,369
Int. Cl. D06n 3/04, 3/18
U.S. Cl. 161—53                                    6 Claims

ABSTRACT OF THE DISCLOSURE

The artificial leather is composed of a woven base fabric having a napped side, a layer of polyurethane resin which has been applied to the napped side, a layer of a binder applied to the polyurethane resin and a surface film of a poly(amino acid) anchored to the polyurethane resin by the binder. The artificial leather resembles natural leather in appearance and touch, has excellent characteristics of moisture permeability, heat resistance, and mechanical strength and may be used like natural leather.

---

This invention relates to a new artificial leather, in particular an artificial leather having as the surface layer, a film of polypeptide, i.e. a poly(amino acid), or a derivative thereof, which resembles collagen of natural leather in molecular structure.

Leather substitutes which have hitherto been put on the market under the names of artificial leather and synthetic leather are products which have been prepared by applying a film of a polyurethane or nylon resin to a fibrous base material. The artificial leathers prepared by means of such known methods resemble natural leathers in external appearance, but have poor air and moisture permeabilities, so that they have little use in the field of application in which natural leathers have been widely employed. Moreover, such artificial leathers have a different texture compared to natural leather, and hence prior artificial leathers do not feel like natural leather.

SUMMARY OF INVENTION

An object of the present invention is to provide an artificial leather having excellent air and moisture permeability such as is inherently possessed by natural leathers and, in addition, an acceptable external appearance, touch and mechanical strength. This object and others are accomplished by this invention.

It has been discovered that artificial leathers having very desirable characteristics are obtained by applying at least two layers of polyurethane resin to the napped side of a base fabric, coating the polyurethane resin with a bonding agent and then applying thereto a coating film of polypeptide or poly(amino acid) resin.

Thus the artificial leather of this invention is comprised of a fibrous base material which has at least one napped side, a layer of polyurethane resin on the napped side of the fabric, a layer of a binder coating the polyurethane resin, and a surface film of a poly(amino acid) anchored to the polyurethane resin by the binder.

The artificial leathers produced in accordance with this invention are light-weight, have excellent characteristics with respect to heat resistance and moisture permeability and in addition, have the external appearance and touch of natural leather.

DESCRIPTION OF THE PREFERRED EMBODIMENTS

The base fabric used for the artificial leather of this invention is a woven fabric having a napped side, such as a satin or a velvet material. The base fabric may be made of natural fibers such as cotton, or silk or it may be made of synthetic fibers such as acetate, nylon or Dacron. Base fabrics made of natural fibers or a mixture of natural and synthetic fibers are preferred, due to their ability to absorb moisture. A particularly preferred base material for the artificial leather of this invention is a fabric woven from chromed collagen fiber.

Chromed collagen fiber, which may be woven on any ordinary weaving machine to produce the desired type of collagen fabric is obtained from chromed split hide. The procedure used to obtain colagen fiber involves soaking the split hide in a warm solution of a non-ionic surface active agent, washing and then tumbling the split hide with an aqueous solution of sodium bicarbonate, oiling the split hide by mixing it with a solution of sulfated olive oil, and then drying it until it contains about 35–45% of water. The split hide is then beaten in a stamp mill, and disintegrated into fibers by mechanical means.

According to this invention, the surface layer of the new artificial leather is composed of a poly(amino carboxylic acid) or derivative thereof, which resembles collagen of natural leather in molecular structure. Examples of such materials include N-carboxyaspartic acid amide resin and resins of poly(glutamic acid) and derivatives thereof such as N-carboxyglutamic acid amide resin. These resins may be obtained by polymerizing about 5 to 10 parts of a lower alkyl glutamate or aspartate such as the methyl, ethyl or butyl derivative, in about 10 to 95 parts of a liquid medium such as ethylene dichloride and/or dioxane. The poly(amino acids) are dopes which are clear viscous liquids, not viscous enough to be drawn into filaments. The average degree of polymerization of such a resin is of the order of 5,000.

Figure 3:
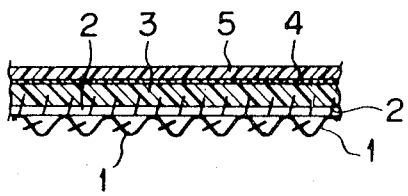
FIG. 3 is an enlarged cross-sectional view of the product of the present invention.

The structure of the artificial leather of this invention is illustrated in FIG. 3, wherein the base fabric 1 having a napped side 2 is coated on the napped side 2, with two or more layers of polyurethane resin 3. A layer of acrylic resin binder 4 is superimposed on the polyurethane resin 3 and a coating film of poly(amino acid), 5, which forms the surface layer of the present artificial leather is anchored to the base fabric by the acrylic resin binder 4 and the polyurethane resin 3.

Figure 1:
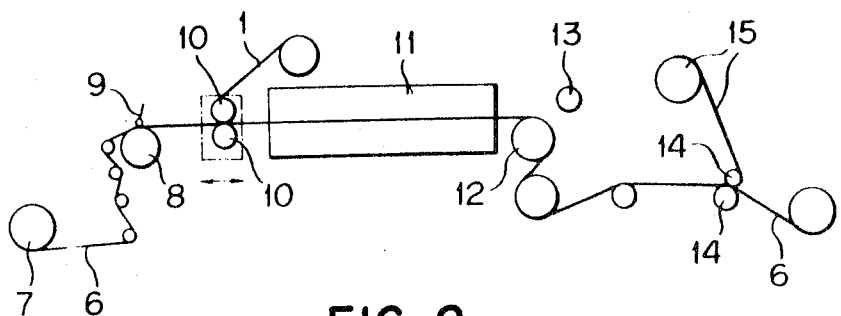
FIGS. 1 and 2 are schematic diagrams of an apparatus used for producing the artificial leather of the present invention.

The application of the polyurethane layer of the artificial leather of the present invention is described with reference to the schematic drawing of FIGS. 1 and 2. In FIG. 1, the base fabric 1 is contacted with a solution of polyurethane resin at the front laminator 10; the base fabric 1, supported by the doctor roll 8, is coated with polyurethane resin by means of the doctor knife 9. The thickness of the coating of polyurethane resin is adjusted by adjusting the distance between the doctor roll 8 and the doctor knife 9. The base fabric containing polyurethane resin is passed through the front laminating rolls 10, so that the liquid resin penetrates into the inner portion of the napped side of the base fabric. By adjusting the distance between the doctor knife 9 and the laminator rolls 10, the degree of penetration of the liquid resin into the napped side may be controlled and accordingly the dimensions and density of wrinkles formed on the final top layer may be varied. The base fabric containing polyurethane resin is passed from the front laminator rolls 10 to the drying oven 11, where it is dried to the degree desired and is then passed to a quenching roll 12, from where it bypasses the rear laminating rolls 13 and is sent by way of a separating roll 14 to a roll 15, which holds the resin-impregnated base fabric 1. About 80 to 100 g. of polyurethane resin per sq./m. is applied to the base fabric in this manner and the operation may be repeated if desired to add another layer of about 50 to 100 g. of polyurethane resin per sq./m. of base fabric. However, in some cases one impregnation with polyurethane resin is sufficient.

A laminating layer of polyurethane resin on a parting paper 6 may also be formed in the apparatus as will be described with reference in FIG. 2. In this case, the parting paper 6 which is composed of a durable paper, preferably a paper which is coated with a film of polyethylene and silicon treated is withdrawn from the feed roll 7. A layer of a solution of polyurethane resin is applied to the parting paper 6 by the doctor knife 9, the thickness of the layer being varied by the distance of the doctor roll 8, which supports the parting paper, from the doctor knife 9. The parting paper 6, containing a solution of polyurethane resin is then passed into the drying oven 11 where it is partially dried and is then sent to the quenching roll 12.

Figure 2:
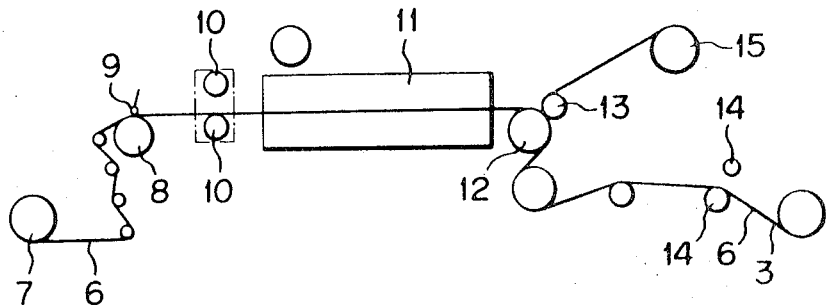

The roll 15, holding the resin-impregnated base fabric, obtained as already described is then reset in the apparatus as shown in FIG. 2. The resin-impregnated base fabric with the resin side up is then passed through the rear laminating roll 13 into contact with the resin treated parting paper 6 which is passed from the quenching roll 12 to the laminating roll 13. The partially dried polyurethane resin film on the parting paper 6 is then laminated with the resin-impregnated base fabric 1 to form a coherent layer of polyurethane resin on the base fabric. In this manner an additional layer of polyurethane resin of about 50 to 100 g. per sq./m. of base fabric is laminated on the base fabric.

After the polyurethane layer has aged for several days, the parting paper is separated and a layer of about 4 to 6 g. per sq./m. of base fabric of an acrylic binder is applied over the polyurethane layer. Finally the acrylic binder is coated with the surface film of a poly(amino acid), in an amount of about 7 to 10 g. per sq./m. of base fabric.

The following specific example further illustrates the present invention; however, this example must not be construed as limiting the scope of the invention in any manner whatsoever.

EXAMPLE

The following materials are employed in the preparation of the artificial leather.

Base fabric: Satin, length of nap or fluff 0.8 mm. Polyurethane resin solution:

```
                                                       Parts
Prepolymer-type polyurethane resin (100,000
  cps. at 25° C.) _____ 100
Polyisocyanate hardener _____   6
Curing accelerator _____   6
Ethyl acetate _____  25
Toluene _____  25
Pigment _____  10
```

The viscosity of the resulting polyurethane resin solution is 9,000 cps. at 20° C. The resin solution is applied to the base fabric twice by impregnation of a solution of resin, and a third application of polyurethane resin is laminated to the base fabric as indicated in the following table.

|  | Amount of the resin solution applied, g./sq. m. | Temperature of the drying oven and dwell time |
| --- | --- | --- |
| Run 1 (impregnation from solution) | 100 | 100° C., 1 minute. |
| Run 2 (impregnation from solution) | 70 | Do. |
| Run 3 (lamination) | ¹ 100 | 115° C., 1 minute. |

¹ Film.

The resin-impregnated base fabric is aged at 30° C. for 3 to 4 days and the parting paper is removed therefrom. To the resin-coated side of the base fabric there is applied an acrylic resin binder. The acrylic resin binder contained 70% of ethyl acetate solvent and 30% of acrylic resin. The acrylic resin consisted of 80% by weight of butyl acrylate and 20% by weight of a mixture of acrylonitrile and acrylamide. Finally, there is applied poly(amino acid) solution consisting of:

```
                                                       Parts
Poly(carboxyglutamic amide) resin of a viscosity
  at 25° C. of 17,000 cps. _____ 78.8
Polyurethane resin of a viscosity at 25° C. of
  54,000 cps. _____  7.8
Dioxane _____   7.8
Pigment _____   5.6
``` in the quantity of 60–70 g./sq. m. The base fabric so coated is passed through a baking oven maintained at about 130° C. at a dwell time of 3 minutes, to form the surface layer of poly(amino acid) resin film.

The product thus obtained has the cross sectional structure shown in FIG. 3 and it is light weight and has natural leather-like, texture. In addition, it is tough and has excellent heat resisting properties, as indicated by the fact that no mark is left thereon when it is contacted with a lighted cigarette. Further, it can be ironed at a temperature of about 150° C. without adverse effect. The product of the present invention has good moisture permeability, and this is believed to be due to the fact that the top layer resembles natural collagen in molecular structure. Liquid water does not permeate the surface of the artificial leather of this invention and in chemical properties, it resembles animal and human skins. Moreover, it has good weather resisting properties and durability.

What I claim and desire to secure by Letters Patent is:

1. Artificial leather comprising a layer of fibrous base material consisting of a woven fabric one side of which has been napped, a coherent coating of polyurethane resin adhering to the napped side of said fabric, a layer of acrylic resin binder adhering to said coating of polyurethane resin, and a film of poly(amino acid) forming the surface layer and anchored to said polyurethane resin layer and said base fabric through said layer of binder said poly(amino acid) being a resin derived from N-carboxyglutamic acid amide or N-carboxyaspartic acid amide.

2. Artificial leather according to claim 1 wherein said polyurethane resin penetrates into the inner portion of said base fabric, and wherein said coherent coating is formed from at least two layers of said polyurethane resin.

3. Artificial leather according to claim 1 wherein said base material is a fabric woven from chromed collagen fiber.

4. A method of producing artificial leather which comprises applying at least two layers of polyurethane resin on the napped side of a fibrous base fabric, applying an acrylic resin as a binding agent to the layer of polyurethane resin and then coating the binding agent with a film of poly(amino acid) resin derived from N-carboxyglutamic acid amide or N-carboxyaspartic acid amide to form the surface layer of said artificial leather.

5. A method according to claim 4 wherein at least one layer of said polyurethane resin is applied to said base fabric by impregnating a solution of said resin into the napped side of said base fabric and then an additional layer of said polyurethane resin is applied to the napped side of said fabric by lamination.

6. A method according to claim 4, wherein said base fabric is a fabric woven from chromed collagen fiber.

References Cited
UNITED STATES PATENTS

| | | | |
|---|---|---|---|
| 3,262,805 | 7/1966 | Aoki | 117—140X |
| 3,294,579 | 12/1966 | Tu | 117—164X |
| 3,336,183 | 8/1967 | Larner et al. | 161—190X |
| 3,369,925 | 2/1968 | Matsushita et al. | 117—140X |
| 3,382,087 | 5/1968 | Erby et al. | 117—135.5X |
| 3,387,989 | 6/1968 | West et al. | 117—76 |
| 3,398,042 | 8/1968 | Odenthal et al. | 161—226X |

JOHN T. GOOLKASIAN, Primary Examiner

J. C. GIL, Assistant Examiner

U.S. Cl. X.R.

117—76, 81, 83, 140, 142, 161, 164; 161—67, 89, 92, 95, 190, 227, 247; 260—6